March 26, 1940.  C. Z. SMITH  2,195,099
VEHICLE BRAKE EQUALIZER
Filed Aug. 23, 1937  3 Sheets-Sheet 1

Inventor
CLARENCE Z. SMITH

By *Johnston & Jennings*
Attorneys

March 26, 1940.  C. Z. SMITH  2,195,099
VEHICLE BRAKE EQUALIZER
Filed Aug. 23, 1937   3 Sheets-Sheet 2
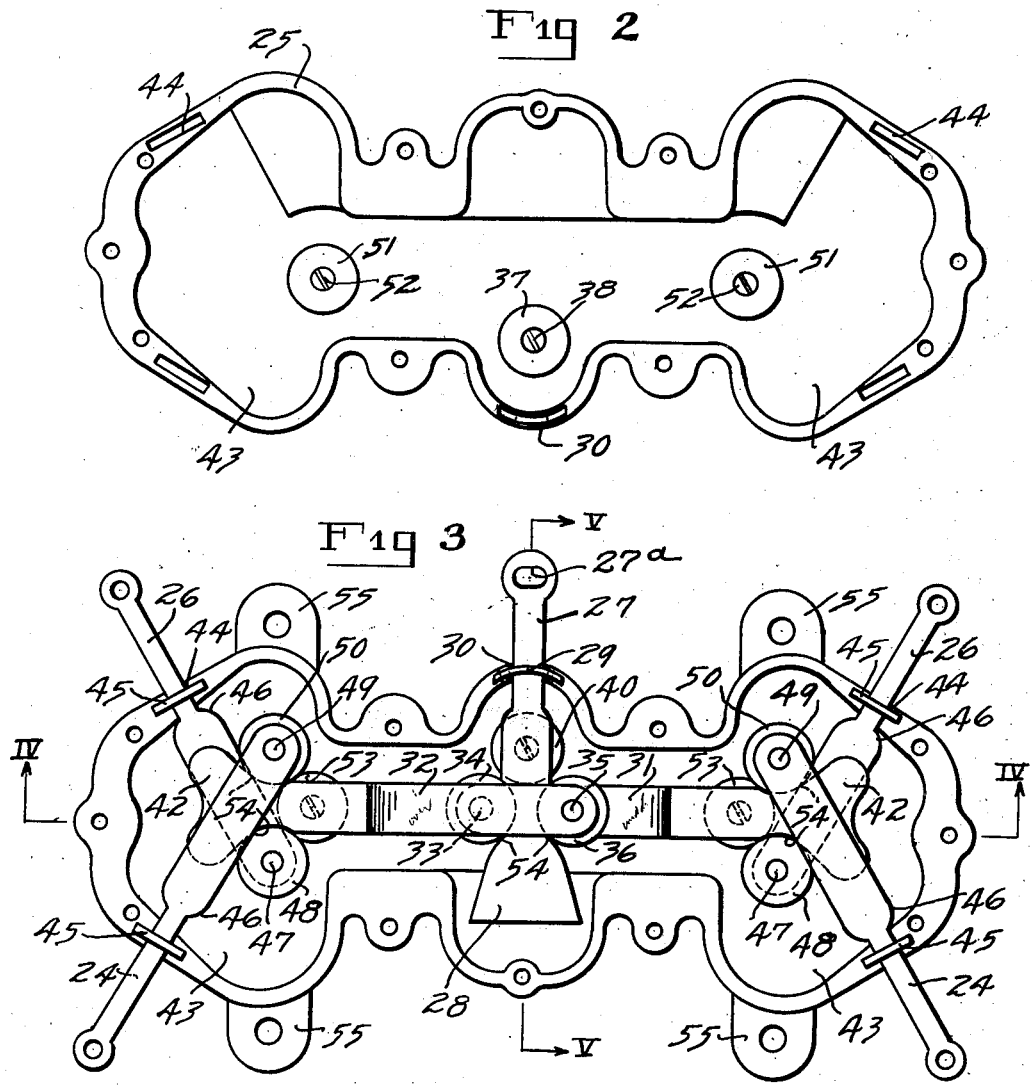
Inventor
CLARENCE Z SMITH
By Johnston Jennings
Attorneys March 26, 1940.  C. Z. SMITH  2,195,099
VEHICLE BRAKE EQUALIZER
Filed Aug. 23, 1937  3 Sheets-Sheet 3

Inventor
CLARENCE Z SMITH
By Johnston & Jennings
Attorneys

Patented Mar. 26, 1940

2,195,099

UNITED STATES PATENT OFFICE 2,195,099

VEHICLE BRAKE EQUALIZER

Clarence Z. Smith, Atlanta, Ga.

Application August 23, 1937, Serial No. 160,461

8 Claims. (Cl. 188—204)

My invention relates to an equalizer for mechanical brakes of the two wheel, four wheel, or multiple type.

My invention is chiefly concerned with the development of a simple and comparatively inexpensive mechanical equalizing transmission, compact in form, comprising elements operable by the ordinary hand and foot brake control means and adapted to translate the applied power into a form that will produce an equalized application of brake pressure to each brake controlled wheel, which power may be amplified where it is desired to apply a greater pressure to one set of wheels than to another set.

In its preferred embodiment, my invention contemplates the provision of a transmission case in which an angularly and lineally movable primary actuator, constituting a floating power element, is adapted to equalize the motion imparted by it, either directly to the brake actuators in the case of a two wheel braking system, or indirectly through floating equalizers to the brake actuators of a four wheel braking system, so that the power available to operate each brake will be equalized throughout the braking system.

My invention further contemplates designing the primary actuator of the equalizer in the form of a double faced cam or wedge, preferably but not necessarily symmetrical in design, the opposite sides of which engage and actuate the transmission elements which it controls.

My invention further contemplates designing the transmission case for a brake system of four or more wheels so as to house therein not only the primary equalizing actuator but also the secondary floating equalizer transmission elements.

My invention also contemplates the interposition of roller bearings between the transmission elements and where needed as thrust bearings between the transmission elements and the case, and to adapt the case to house the equalizer elements so that they may work in grease or lubricant.

My invention further contemplates causing the secondary actuators to cross to engage the primary actuator on opposite sides, and in like manner for each pair of brake applying elements to cross and engage opposite working faces of their respective secondary actuator, with all the elements so mounted in the case that both the driving and driven actuators can float in setting themselves to equalize the application of pressure to the several brake actuators.

My invention also comprises the novel details of construction and arrangements of parts which, in their preferred embodiment only, are illustrated in the accompanying drawings which form a part of this specification, and in which:

Fig. 2 is a plan view enlarged of the upper half of the equalizer casing inverted.

Fig. 3 is a plan view of the lower half of the equalizer casing.

Fig. 5 is a transverse cross sectional view of the assembled transmission casing taken on the line V—V of Fig. 3.

Similar reference numerals refer to similar parts throughout the drawings.

While it is to be understood that my invention is applicable to various types of brake systems for automobiles or other vehicles, I have illustrated it in its preferred embodiment in Figs. 1 to 5 as applied to a four wheel brake system for an automobile.

Figure 1:
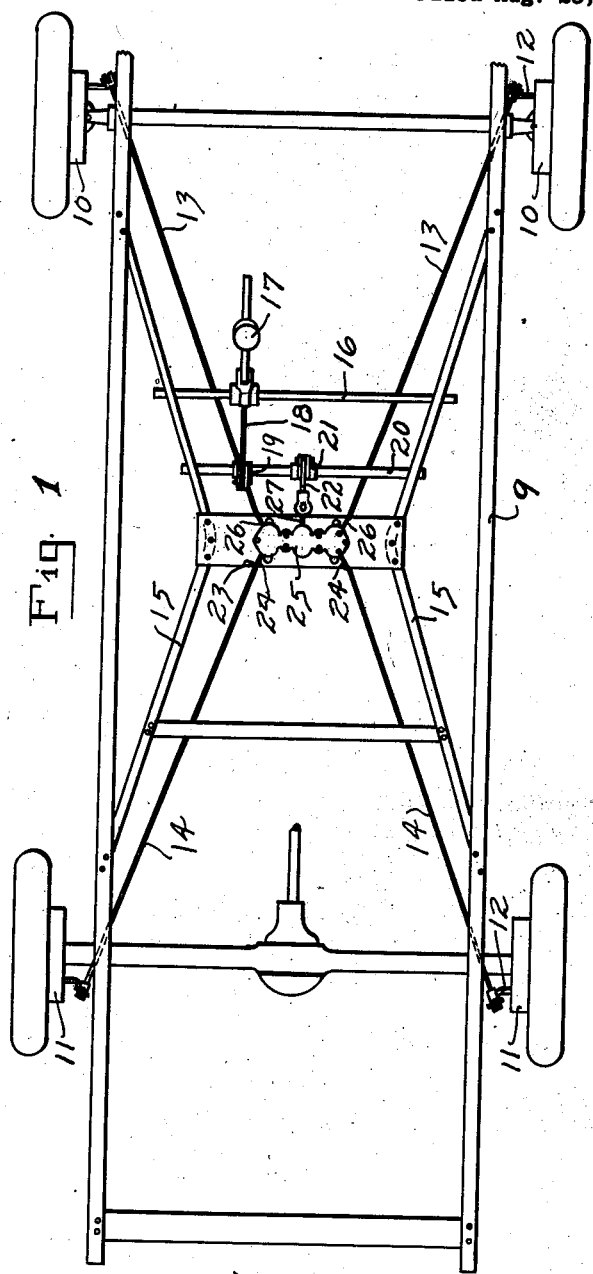
Fig. 1 is a plan view illustrating a chassis with a four wheel braking system showing one manner of connecting up the equalizer to the brake rods on the one hand and to the brake applying elements on the other.

In Fig. 1 I have conventionally illustrated a chassis 9 with front wheel brake drums 10 and rear wheel brake drums 11, and it will be understood that any form of brake mechanism may be utilized in the drums. The brake mechanism in each drum is controlled by a crank arm or lever 12 to the free outer end of which is attached a brake operating rod which for the front wheels is indicated at 13 and for the rear wheels is indicated at 14. Any suitable type of transmitter may be used for applying the brake power from the pedal to the brake element in a drum. In the current design of automobiles many of the frames have an X-type brace 15 and such a frame is illustrated in Fig. 1 and to it, near its center, is usually mounted the bearings for a rocker shaft 16 which is operated by the brake pedal 17 and a hand lever (not shown), and by means of arm 18 and crank 19 it rocks the countershaft 20. A crank 21 on the shaft 20 by a rod 22 actuates a rocker shaft, not shown, having crank connections to the brake rods 13 and 14. This mechanism is standard in most cars and is in part illustrated to show how my present invention may be coordinated with the present type of automobiles so as to be readily applied as an accessory thereto.

In applying my present invention to an existing four wheel mechanical brake system, the brake operating rods 14 leading to the rear brakes are detached from the rocker crank shaft that formerly operated them and are shortened so that they can be coupled at 23 to rear brake actuators 24 that enter the equalizer transmission casing 25. In like manner the brake rods 13 for operating the front wheel brakes are coupled to the front brake actuators 26 which enter the front side of the equalizer casing.

The equalizer casing 25, made in half sections as shown more clearly in Figs. 2 and 3, houses a primary actuator having a shank 27 projecting forwardly from the casing and connected to the pedal operated rod 22. A double faced wedge or cam 27 is formed or otherwise mounted at the inner end of the shank 27. This shank where it enters and slides in the casing 25 is rounded to receive a felt packing 29 seated in the contracted throat of a guide bearing 30 which is flared (as will be more clearly seen in the device illustrated in Fig. 6) to permit the actuator to rock angularly in the casing. The felt packing 29 will prevent at the point of use the escape of grease with which the transmission casing should be kept filled. The double faced cam 28 of the primary actuator is thus mounted to float, free to have both angular motion in a horizontal plane about bearing 30, and lineal play in the equalizer casing, which is necessary to obtain equalization of braking pressure as applied to the several brakes which it controls. The outer end of the shank 27 is provided with a hole 27a (Fig. 3) which is enlarged so that the pin, connecting the shank to arm 22, can have enough lateral play therein to allow the shank to have the limited angular motion required for it to equalize its action on the several brake actuators which it controls.

The casing 25 is so shaped as to receive secondary floating transmitters 31 and 32, duplicates except that one is a right hand and the other is a left hand element, which pass one under and the other over the primary actuator 27 and are free to play as they are moved responsive to the manipulation of the primary actuator.

The underpassing transmitter 31 carries an upstanding stud bearing pin 33 on which is loosely set an antifriction roller 34 which engages the double cam 28 on one side, while the overpassing transmitter 32 is provided with a depending stud bearing pin 35 upon which is loosely set an antifriction roller 36 which engages the opposite side of the cam 28.

The upper section of casing 25, shown in Fig. 2, at or near its center receives an antifriction roller 37 which is mounted on a headed stud bearing pin 38, threaded and screwed through the upper casing member and held fast by any suitable means. This roller 37 serves as a fixed roller thrust bearing against which the forward edge of the overpassing transmitter 32 bears free to play angularly and to have motion lineally without frictional engagement with the casing when actuated by the cam 28.

The under section of casing 25 is similarly equipped with an antifriction thrust bearing roller 40, similarly mounted on a stud bearing 41 against which the forward edge of the underpassing transmitter 31 bears free to play lineally and angularly in the casing without frictional engagement therewith, when actuated by the cam 28.

Figure 4:
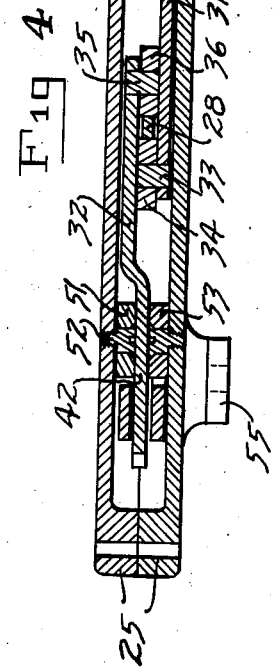
Fig. 4 is a longitudinal cross section through the assembled casing taken on the line IV—IV of Fig. 3.

The rollers 37 and 40 function to prevent the inner ends of the transmitters moving forward in response to a forward pull on the cam 28 that is wedged between their rollers 34 and 36, see Fig. 4, and they also form fulcrums about which the transmitters can rock horizontally as their outer ends shift in equalizing the action on the brakes they respectively control.

Each transmitter 31, 32 is provided with a double faced cam or wedge 42 and the casing 25 at each end is enlarged at 43 to receive these cams 42 with room for them to play both lineally and angularly as they perform their work.

The actuators 26 for the front wheel brakes are rounded where they enter the forward sides of the chambers 43 through guides 44 in which they are free only to slide, these guides being recessed at an intermediate point to receive felt packing rings 45 to prevent the escape of grease along the actuators. In like manner the actuators 24 for the rear wheels enter the rear sides of these chambers 43 through slide guides similarly packed.

It will be noted in Fig. 3 that each of these actuators has its inner flattened end formed with a stop shoulder 46 to limit its outward movement from the casing 25. As illustrated, each front wheel actuator passes under the transmitter cam 42 which respectively controls it and is provided with an upturned pin 47 upon which is loosely set an antifriction roller 48 which coacts with its respective double faced cam 42 on the side remote from the point where the actuator enters the casing 25. In like manner each overpassing actuator 24 for the rear brakes passes over its transmitter cam 42 and carries a depending pin 49 upon which is loosely set an antifriction roller 50 which rides on the casing bottom or any suitable slide support. Thus each secondary transmitter cam 42 is interposed between the actuator members passing over and under it and engaged on opposite sides by the rollers 48 and 50 of said actuators.

The upper casing section (Fig. 2) carries at each end an antifriction roller 51 mounted on a fixed stud bearing such as 52 which is disposed to engage the thrust bearing side edge of the overpassing actuators 24, and in like manner the under portion of the casing carries similarly mounted rollers 53 adapted to engage the thrust edges of the under passing actuators. As shown the cam faces of all of the double cams 42 and 28 terminate at their inner ends in concave seats 54 conforming substantially to the periphery of the rollers engaging such seats, thus providing a centering seat into which each actuator roller will come to rest when the brake applying pressure is released.

The casing sections are provided with suitable apertured ears by means of which they are adapted to be bolted securely together with a suitable gasket interposed to prevent the leakage of the contained lubricant, and the upper casing section is provided with legs 55 by means of which it may be bolted or otherwise attached to a cross support 56 on the X-frame.

It will of course be understood that the brake mechanism for each wheel is provided with suitable spring means tending to release the brakes when the brake applying pressure is off and these springs will act through the brake rods to pull the actuators 24 and 26 outwardly until their stops 46 engage the transmission casing, when the rollers 48 and 50 on these actuators will rest in the concave seats 54 at the bases of their respective wedge faces. In like manner the spring, (not shown) that resets the brake pedal will thrust the primary actuator cam 28 inwardly to the position shown in Fig. 3 with the rollers 34 and 36 on the secondary transmitters resting in the seats 54 at the bases of their respective wedge faces. The position of parts as shown in Fig. 3 is that assumed when the brakes are relaxed.

In operation, assuming the parts disposed in brake released position, as shown in Fig. 3, when the brake pedal is operated, the primary actuator 27 is drawn forwardly from the casing and as it moves it forces its double wedge 28 between the rollers 34 and 36 which, being held against forward motion by the engagement of the thrust bearing rollers 37 and 40, with the inner ends of the transmitters 31 and 32, will be laterally displaced by the wedge 28 so as to have opposed lineal motion which will be equal and without angular motion if no equalization action is required, but if the brake system controlled by either transmitter becomes set in advance of that controlled by the other, the cam 28 will shift angularly to continue the application of braking pressure to the latter system until it too becomes set. In like manner, as each transmitter is actuated by cam 28, if the two brakes it controls are equalized, it will have only linear motion; but if either of its brakes sets in advance of the other its cam 42 will shift angularly until it sets both brakes equally. These transmitters are thus moved reversely and as they move they are free to play both angularly and lineally in a horizontal plane to allow for the equalization necessary for the correct application of the several brakes which they respectively control. As these floating transmitters are thus moved, their respective double cams 42 are drawn together and in thus moving they wedge apart the rollers 48 and 50 carried by the brake actuators which they respectively control. This results in thrusting or drawing the brake actuators inwardly into the equalizer casing and as they are thus drawn in they apply equalized pressure to operate the several brakes which they respectively control. Whichever brake sets first, will arrest further movement of its respective roller and thus the further movement of the cam will be exerted wholly to displace the other transmitter or actuator which it controls and in this way equalization throughout is effected of the braking action on the wheels of the car. All transmission elements in the equalizer are free to float as they work and though they are positively actuated they allow the braking system to set itself to its work with uniformity throughout. By this means a complete equalization of braking effect is always provided for all of the brakes.

In order to obtain an equal motion for the angularly disposed brake actuators 24 and 26 as compared with that imparted to the aligning secondary transmitters 31 and 32, the angular disposition of the cam faces of the primary actuator 28 define between them an angle approximately one-half that defined between the working faces of the secondary transmitter cams 42. The relative angles are determined by the angular relationship of the brake actuators 24 and 26.

Figure 8:
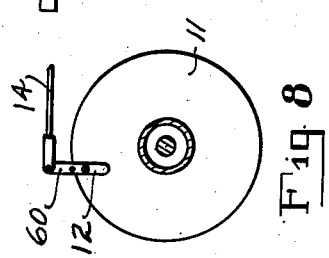
Fig. 8 is a detail view of an adapter applied to a brake crank to increase the leverage available to apply the brakes.

In Fig. 8 I show an adapter 60 which may be applied to the operating levers 12 for the front or rear wheels and these adapters will increase the leverage for, and reduce the movement of the brake which they respectively apply, thus enabling an equalized power to be delivered to a selected group of brakes which however will produce greater or less effect as compared with the brakes of another group. This allows more braking pressure to be applied to the rear wheels than to the front wheels, or vice versa.

Figure 6:
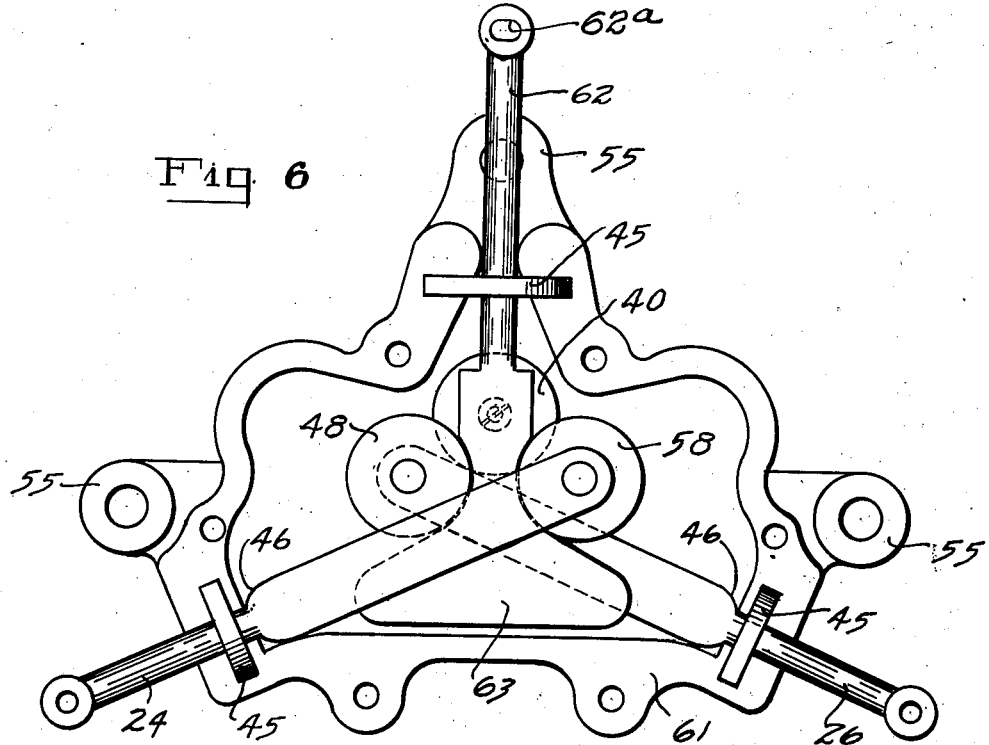
Fig. 6 is a plan view of one section of an equalizer casing for a two wheel brake system embodying my present invention.
Figure 7:
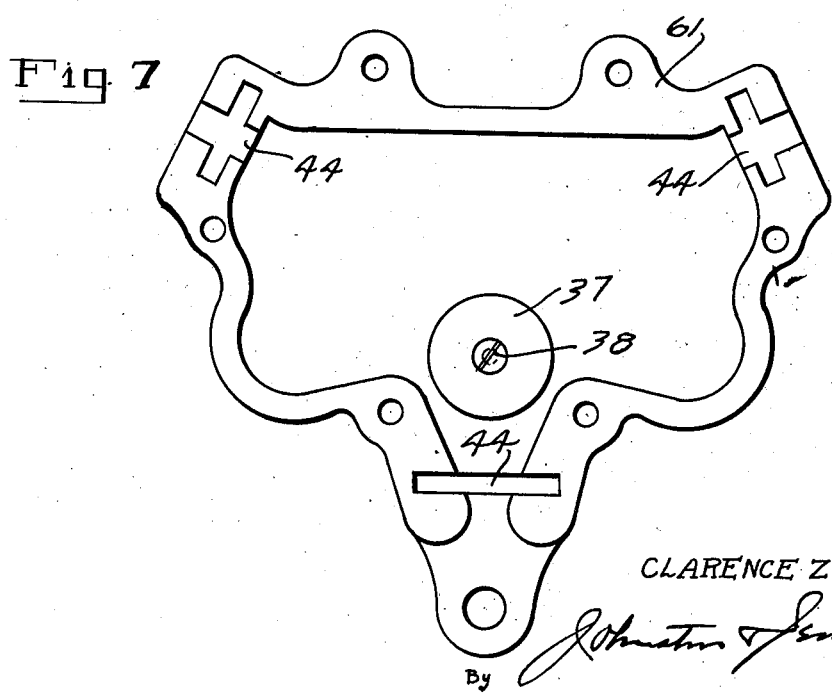
Fig. 7 is a bottom view of the other section of the casing shown in Fig. 6.

In the simpler embodiment of my invention, which is illustrated in Figs. 6 and 7, I show my invention designed for controlling a single pair of wheel brakes. Here the primary actuator 62 and cam 63 are similar to 27 and 28 already described but the equalizer casing 61 is very much smaller than 25, as the secondary transmitters 31 and 32 are omitted, and more room for play is allowed for actuator 62. An elongated hole 62a is provided in the outer end of the shank of the primary actuator 62 and serves the same purpose as that described for hole 27a in the shank 27. The brake actuators 24 and 26 are also the same as already described and enter the transmission case through packed slide bearings and are shouldered at 46 to stop their outward play. In the manner already described, one of them passes over and the other under the primary actuator 62 and the rollers 48 and 58 which they carry engage the opposite faces of the double actuator cam 63. In this arrangement, when the primary actuator or power cam 63 is moved, it will exert directly on the brake actuators an equalizing control similar to that already described. This equalizer casing 61 is formed in half sections bolted together with an interposed gasket, like casing 25, and it has similar mounting legs 55. Its sections also carry the thrust bearing rollers 37 and 40 for the brake actuators.

It is contemplated that the equalizer casings 25 and 61 will be packed with grease and any convenient means may be used for its replacement.

My invention is characterized by the utilization in the equalizing transmission case of one or more floating power transmitting cams, according to the number of sets of wheels to be controlled, and the whole transmission is very compact and practically frictionless. It can be readily applied as an accessory to existing cars without other changes than the shortening of the brake rods and the provision of inexpensive adapters, if desired, to facilitate the connections of the brake rods to the brake levers or to the equalizing actuators. My transmission apparatus is inexpensive because, even for the four wheel construction, the secondary transmitters are duplicate forgings which differ merely in the position of the roller stud bearing pins and all four of the brake actuators are duplicate forgings also differing merely in the application of their roller bearing pins.

While I have shown my invention in but two forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. A mechanical equalizer means for vehicle brakes, comprising a wedge actuator mounted free for angular and lineal motions, brake actuators mounted for lineal movement, thrust bearings to hold said brake actuators substantially to linear movement, and rollers journalled on the brake actuators and disposed to engage the wedge actuator between them in position to produce equalized lineal motion in the brake actuators responsive to lineal movement of the actuator.

2. A mechanical equalizer means for vehicle brakes, comprising a wedge actuator mounted free for angular and lineal motions responsive to pedal control, brake actuators mounted for lineal play, thrust bearings for said brake actuators disposed to prevent their angular play responsive to thrust imposed thereon by the wedge actuator, and rollers journalled on the brake actuators and disposed to engage the wedge actuator between them in position to produce equalized lineal motion in the brake actuators towards the actuator responsive to lineal movement of the actuator.

3. A mechanical equalizer according to claim 1, in which the brake actuators cross over and under said wedge actuator, and a casing which is filled with lubricant, encloses and acts to hold said brake actuators in engagement with said wedge actuator.

4. A mechanical equalizer means for vehicle brakes, comprising a casing, a primary pedal actuated wedge mounted for reciprocation and lateral play in said casing, secondary transmitters crossing the wedge from opposite sides and having elements that engage the wedge between them, thrust bearings for the transmitters, a wedge on each transmitter, and brake actuators mounted to reciprocate on said casing, responsive to movement of said transmitter wedges.

5. A mechanical equalizer for vehicle brakes, comprising a pedal reciprocated double faced wedge mounted free for lateral play, transmitters crossing said wedge with rollers engaging the wedge between them, thrust bearings for the transmitters leaving them free for lineal and angular play, a double wedge carried by each transmitter, a pair of brake actuators for each transmitter carrying rollers mounted to engage their respective transmitter wedge between them, and thrust bearings for the brake actuators.

6. A mechanical equalizer for vehicle brakes, comprising a pedal reciprocated double faced wedge mounted free for lateral play, transmitters crossing said wedge with rollers engaging the wedge between them, thrust bearings for the transmitters leaving them free for lineal and angular play, a double wedge carried by each transmitter, a pair of brake actuators mounted to cross each transmitter and carrying rollers mounted to engage their respective transmitter wedge between them, and thrust bearings for the brake actuators.

7. In a mechanical brake equalizer, a reciprocable wedge mounted for angular and lineal play, driven elements mounted to pass, one over and the other under, the wedge from opposite sides thereof, rollers on one end of each of said elements which engage the wedge between them, thrust bearings for said elements, and means connecting said elements to the brakes they respectively operate, said means each comprising like groups of elements consisting of a floating wedge actuator, crossed elements carrying rollers engaging their respective wedge actuator between them, thrust bearings for said latter elements, and a brake rod connecting each latter element to the brake it respectively controls.

8. In a mechanical equalizer, a sectional casing containing lubricant and brake actuators slidable thereinto, a pedal actuated double faced wedge slidable into and free for lateral play in said casing, crossed transmitters passing over and under said wedge and carrying on their inner ends rollers that engage the wedge faces between them, a wedge head on each transmitter, a pair of said brake actuators being crossed relatively to each wedge head and equipped with rollers that engage the wedge head between them, and means to seal the joints between the casing sections and surrounding each brake actuator and the pedal actuated wedge.

CLARENCE Z. SMITH.